(12) United States Patent
Navale et al.

(10) Patent No.: US 11,982,207 B2
(45) Date of Patent: May 14, 2024

(54) TIP REPAIR OF A TURBINE COMPONENT USING A COMPOSITE TIP BORON BASE PRE-SINTERED PREFORM

(71) Applicant: Siemens Energy, Inc., Orlando, FL (US)

(72) Inventors: Atul L. Navale, Houston, TX (US); James A. Yarbrough, Winston-Salem, NC (US); Somesh J. Ghunakikar, Orlando, FL (US); Ivan F. Oliver Vargas, Houston, TX (US)

(73) Assignee: Siemens Energy, Inc., Orlando, FL (US)

( * ) Notice: Subject to any disclaimer, the term of this patent is extended or adjusted under 35 U.S.C. 154(b) by 129 days.

(21) Appl. No.: 17/438,489

(22) PCT Filed: Mar. 29, 2019

(86) PCT No.: PCT/US2019/024750
§ 371 (c)(1),
(2) Date: Sep. 13, 2021

(87) PCT Pub. No.: WO2020/204872
PCT Pub. Date: Oct. 8, 2020

(65) Prior Publication Data
US 2022/0145765 A1    May 12, 2022

(51) Int. Cl.
*F01D 5/20*    (2006.01)
*B23P 6/00*    (2006.01)
*F01D 5/00*    (2006.01)

(52) U.S. Cl.
CPC .............. *F01D 5/20* (2013.01); *B23P 6/002* (2013.01); *F01D 5/005* (2013.01);
(Continued)

(58) Field of Classification Search
CPC ......... F01D 5/20; B23P 6/002; F05D 2230/80
See application file for complete search history.

(56) References Cited

U.S. PATENT DOCUMENTS

| | | | |
|---|---|---|---|
| 6,908,288 B2* | 6/2005 | Jackson | F01D 5/005 29/889.1 |
| 9,777,574 B2* | 10/2017 | Navale | F01D 5/027 |

(Continued)

FOREIGN PATENT DOCUMENTS

| | | |
|---|---|---|
| EP | 1721699 A1 | 11/2016 |
| EP | 3178602 A1 | 6/2017 |

(Continued)

OTHER PUBLICATIONS

Harris, MAR M 247 Derivations—CM247 LC DS Alloy CMSX Single Crystal Alloys Properties & Performance, 1984 (Year: 1984).*

(Continued)

*Primary Examiner* — Eldon T Brockman

(57) ABSTRACT

A method for repairing a tip portion of a turbine component having a structural defect is provided. The method includes removing a damaged section in turbine component with a structural defect in a tip portion of the turbine component. A pre-sintered preform is provided including a first portion having a first composition and a second portion having a second composition. The pre-sintered preform is configured to mate with an upper surface of a remaining portion of the turbine component. The method also includes applying the pre-sintered preform to the upper surface, wherein the PSP comprises a superalloy material and a braze material. The PSP and the remaining portion of the turbine component are subjected to a brazing process to melt the braze material and fill in the structural defect.

17 Claims, 3 Drawing Sheets

(52) U.S. Cl.
CPC ...... *F05D 2220/32* (2013.01); *F05D 2230/80* (2013.01); *F05D 2240/30* (2013.01)

(56) References Cited

U.S. PATENT DOCUMENTS

| | | | | |
|---|---|---|---|---|
| 10,030,527 | B2* | 7/2018 | Stratton | B23K 35/0222 |
| 10,052,724 | B2* | 8/2018 | Srinivasan | B23K 35/025 |
| 10,828,732 | B2* | 11/2020 | Henderson | F01D 25/005 |
| 11,154,956 | B2* | 10/2021 | Garay | B23K 35/0244 |
| 2003/0082053 | A1* | 5/2003 | Jackson | F01D 5/005 |
| | | | | 29/889.1 |
| 2005/0091848 | A1* | 5/2005 | Nenov | F01D 5/005 |
| | | | | 416/223 R |
| 2006/0134454 | A1 | 6/2006 | Sathian | |
| 2010/0200189 | A1* | 8/2010 | Qi | B23K 35/0244 |
| | | | | 29/889.1 |
| 2014/0154082 | A1* | 6/2014 | Shinn | B23K 1/20 |
| | | | | 228/119 |
| 2015/0360329 | A1 | 12/2015 | Pham et al. | |
| 2016/0003066 | A1* | 1/2016 | Stratton | C22C 19/056 |
| | | | | 228/101 |
| 2016/0199930 | A1 | 7/2016 | Yarbrough | |
| 2017/0252875 | A1* | 9/2017 | Srinivasan | B23K 1/0018 |
| 2018/0313226 | A1* | 11/2018 | Henderson | B23K 35/0244 |

FOREIGN PATENT DOCUMENTS

| | | |
|---|---|---|
| EP | 3395494 A1 | 10/2018 |
| JP | H06344129 A | 12/1994 |
| JP | 2010069568 A | 4/2010 |
| JP | 2015504499 A | 2/2015 |
| JP | 2017196661 A | 11/2017 |
| RU | 2006105940 A | 9/2007 |
| RU | 2598018 C2 | 9/2016 |

OTHER PUBLICATIONS

PCT International Search Report and Written Opinion of International Searching Authority dated Jan. 8, 2020 corresponding to PCT International Application No. PCT/US2019/024750 filed Mar. 29, 2019.

* cited by examiner

TIP REPAIR OF A TURBINE COMPONENT USING A COMPOSITE TIP BORON BASE PRE-SINTERED PREFORM

BACKGROUND

1. Field

The present disclosure relates generally to the field of metallurgy, and more particularly, to processes for the repair of structural defects in a metallic substrate, and even more particularly, to a tip repair of a turbine component using a composite boron base pre-sintered preform.

2. Description of the Related Art

Gas turbines are well-known in the art. It is an ongoing quest within the gas turbine field to increase the thermal efficiency of the gas turbine cycle. One way this has been accomplished is via the development of increasingly temperature-resistant materials, or materials that are able to maintain their structural integrity over time at high temperatures. For this reason, the hot gas path components of gas turbine engines are often formed from superalloy materials. The term 'superalloy' is used herein as it is commonly used in the art to refer to a highly corrosion and oxidation resistant alloy that exhibits excellent mechanical strength and creep resistance at high temperatures, e.g., >1000° C.

Despite their strength, superalloy components in the hot gas path of a turbine engine are susceptible to damage (defects) due to their long term exposure to significant thermal and mechanical stresses. It is generally known that superalloy materials are among the most difficult materials to repair. Welding of many superalloys, however, is difficult because of the propensity of these materials to develop weld solidification cracking and strain age cracking. Thus, repair processes for superalloy materials which eliminate welding while maintaining the structural integrity of the part are desired.

SUMMARY

Briefly described, aspects of the present disclosure relate to a method for repairing a tip portion of a turbine component having a structural defect and a pre-sintered preform (PSP) corresponding to a tip of a turbine component.

A disclosed embodiment is directed to a method for repairing a tip portion of a turbine component having a structural defect. The method includes priding a turbine component with a structural defect in its tip portion and then removing the damage section by machining or cutting the tip portion. A pre-sintered preform (PSP) configured to mate with an upper surface of the remaining portion of the turbine component is provided and then applied to the upper surface. The pre-sintered preform may comprise a superalloy material and a braze material. The combined PSP and turbine component may be subjected to a brazing process in which the braze material melts and fills in the structural defect. The PSP comprises a first portion having a first composition and a second portion having a second composition. The method allows for the use of boron in the braze material to reduce the temperature at which brazing is carried out.

A further disclosed embodiment is directed to a pre-sintered preform (PSP) corresponding to a tip of a turbine component. The PSP includes a tip shelf portion configured to mate with a top surface of a turbine component airfoil and a squealer tip portion extending radially from the tip shelf portion. The tip shelf portion includes a first composition and the squealer portion includes a second composition.

DETAILED DESCRIPTION

Figure 1:
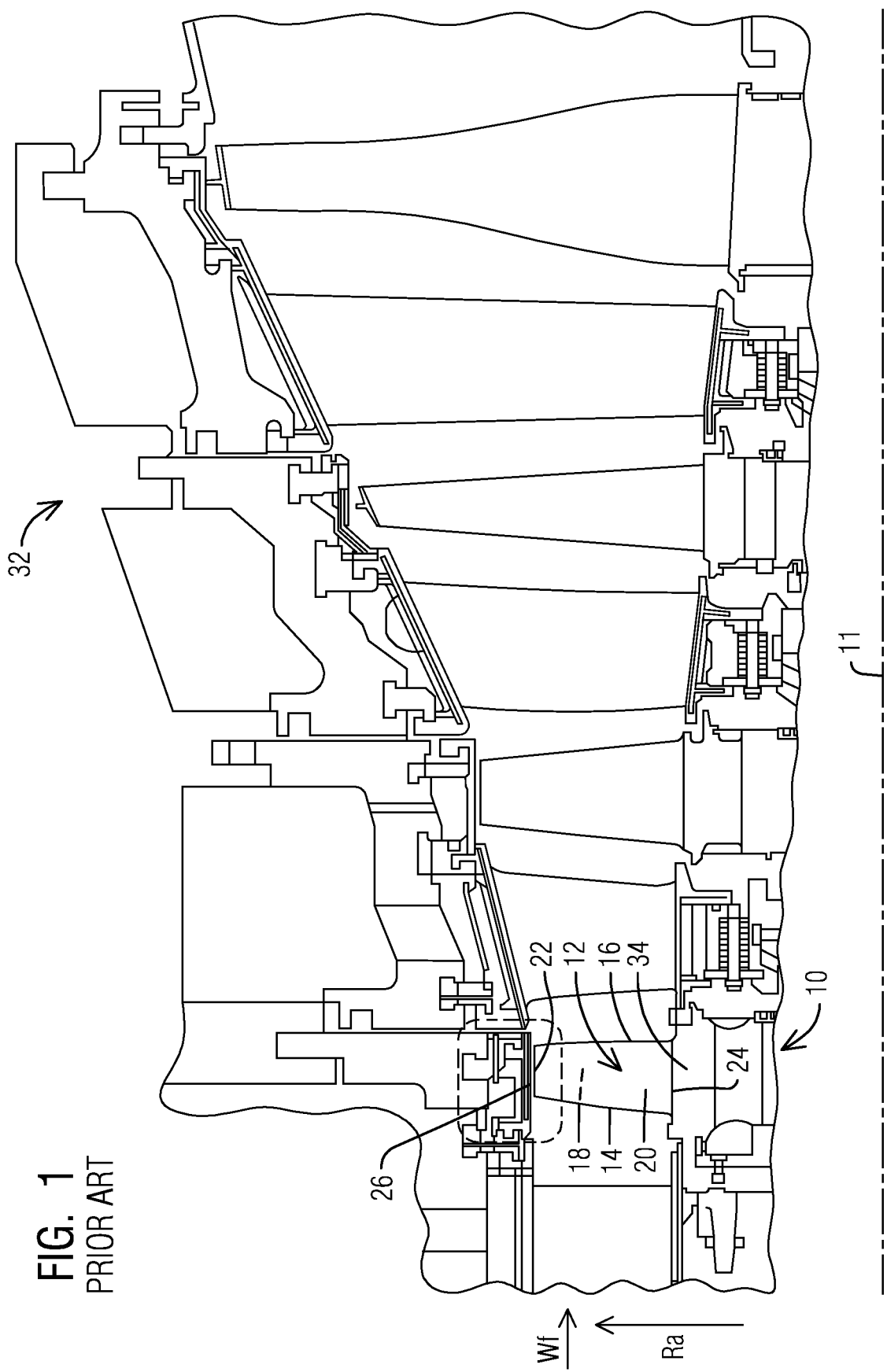
FIG. 1 is an axial cross-sectional view of a gas turbine engine with a row of turbine blades wherein embodiments of the present invention may be incorporated.

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

A gas turbine engine may comprise a compressor section, a combustor and a turbine section. The compressor section compresses ambient air. The combustor combines the compressed air with a fuel and ignites the mixture creating combustion products comprising hot gases that form a working fluid. The working fluid travels to the turbine section. Within the turbine section are circumferential alternating rows of vanes and blades, the blades being coupled to a rotor. Each pair of rows of vanes and blades forms a stage in the turbine section. The turbine section comprises a fixed turbine casing, which houses the vanes, blades and rotor.

The turbine blades include a radially inner root and a radially outer tip. The tip of a turbine blade can have a tip feature to reduce the size of the gap between ring segments and blades in the gas path of the turbine to prevent tip flow leakage, which reduces the amount of torque generated by the turbine blades. The tip features can be referred to as squealer tips and incorporated onto the tips of blades to help reduce aerodynamic losses between turbine stages. These features are designed to minimize the leakage between the blade tip and the ring segment.

Currently, structural defects affecting the tip area of a turbine component such as a blade or vane involve grinding and a weld build-up of the squealer tip utilizing a filler material. Additionally, cracks may be removed in the shelf portion of the tip and airfoil by weld repairing the damaged section with the filler material at ambient temperature or at elevated temperature using a hotbox weld repair process. Hot-box weld repairs may take eight hours or more to complete and the requirement for working inside of the hot box to maintain the elevated temperature makes it difficult to perform such welds.

Broadly, the inventor proposes a braze process utilizing a pre-sintered preform (PSP) having a varied composition for repairing a structural defect of a tip portion of a turbine component. 'Braze only' processes may be used to repair the tip damage of a turbine component without the need for any weld repair process. Since no welding is needed, all the shortcomings of welding processes are eliminated—such as the need for overage heat treatment, the need for skilled welders, and heat affected zone cracks.

Pre-sintered preforms (PSPs) typically contain a powder mixture of base alloy particles and braze alloy particles that is pre-sintered so that the particles establish a metallurgical bond. Additionally, pre-sintered preforms do not include a binder material which creates voids. The pre-sintered material is formed in a net shape that may be used in a repair process such as that proposed. In the case of the proposed repair process, a composite boron base PSP of a turbine component tip may be utilized.

Referring to FIG. 1, a portion of a turbine engine 32 is shown. A centerline 11 is shown to represent an axial center of the turbine engine 32. A radial direction Ra is shown in a direction that is radially outward. Further, a working fluid Wf direction is shown. A turbine blade 10 is formed from a root portion 34 coupled to a rotor disc (not shown) and an elongated portion forming an airfoil 12 that extends outwardly from a platform 24 coupled to the root portion 34. At an opposite end of the turbine blade 10, the blade 10 is composed of a tip 22 opposite the root section 34, a leading edge 14, and a trailing edge 16. Connecting the leading edge 14 and the trailing edge 16 is radially extending a pressure side 18 and a suction side 20 of the airfoil 12. Along the tip end 22 of the turbine blade 10 is a tip feature in position to reduce the size of the gap between ring segments 26 and blades 10 in a gas path of a turbine to prevent tip flow leakage, which reduces the amount of torque generated by the turbine blades 10. The tip feature is referred to as a squealer or squealer tip and is incorporated onto the tips of blades to help reduce aerodynamic losses between turbine stages. These features are designed to minimize the leakage between the blade tip 22 and the ring segment 26.

Figure 2:
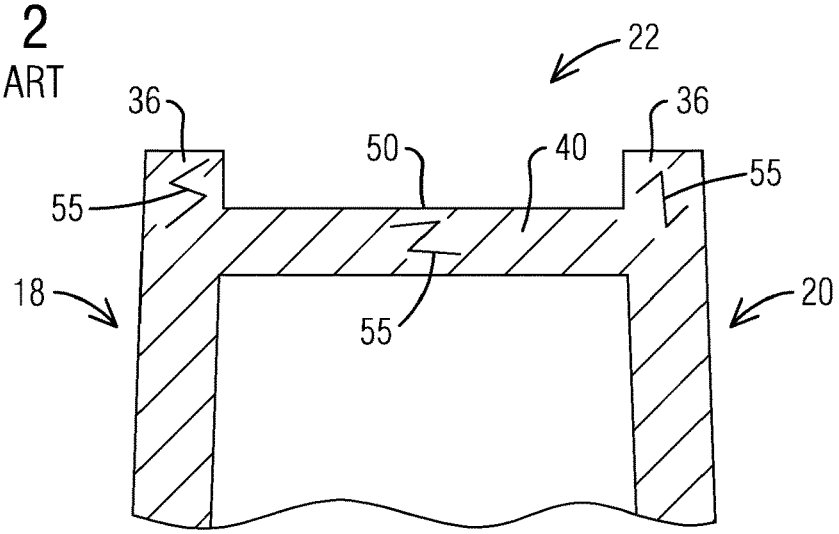
FIG. 2 is a partial cross-sectional view of a configuration of a tip portion of a turbine component.

FIG. 2 represents a conventional squealer tip 36 location where spaced apart tip walls extend directly up from and extending the length of the pressure side 18 and suction side 20 of the blade 10. At the tip end 22 lying in between the squealer tip walls 36 lies a tip shelf 40 having a tip shelf surface 50.

As noted above, it is appreciated that during operation the blades, particularly in the early stages of the turbine engine, may be susceptible to significant thermal and mechanical stresses. Accordingly, particularly with some superalloys, it is common to see cracking and other defects develop on the tip of the blade, particularly in the squealer tip walls 36 and shelf area 40 of the tip 22. FIG. 2, for example, illustrates the tip 22 comprising cracks (discontinuities) 55 extending into the squealer tips 36 and in the shelf region 40 of the tip. While cracking is shown, other defects such as squealer tip rub or shelf rub may also be considered defects needing repair.

Figure 3:
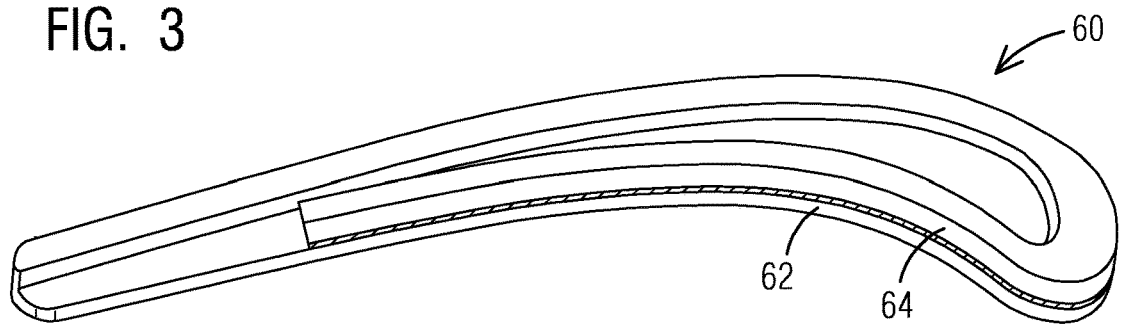
FIG. 3 is a perspective view of a PSP composite tip coupon according to an embodiment of the present invention.

The turbine component may comprise any suitable metal material. In an embodiment, the turbine component may comprise a superalloy material. For illustrative purposes, the turbine component referred to herein will be a turbine blade. Exemplary superalloys include but are not limited to Hastelloy, Inconel (e.g. IN100, IN600, IN713), Waspaloy, Rene alloys, Haynes alloys, Incoloy, MP98T, TMS alloys, and CMSX (e.g. CMSX-4) single crystal alloys. In a particular embodiment, the turbine component is formed from an Alloy 247 material (a CM247 or MAR-M247 material as is known in the art and commercially available from Praxair Surface Technologies). In an embodiment, the Alloy 247 material may have a composition within the following ranges (in wt. %):

C=0.07-0.15%
Cr=8.1-8.4%
Co=9.2-10.0%
Al=5.5-5.6%
B=0.015%
W=9.5-10.0%
Mo=0.5-0.7%
Ta=3.0-3.2%
Ti=0.7-1.0%
Hf=1.4-1.5%
Zr=0.015-0.05%
Ni=balance FIG. 3 illustrates a composite PSP tip coupon 60 that will be used to repair a turbine component. The composite tip coupon 60 includes a tip shelf (cap) portion 62 and a squealer portion 64. The tip shelf portion 62 comprises a first composition and the squealer portion 64 comprises a second composition. In an embodiment, the first composition and the second composition are different. Each portion of the PSP may comprise a powder mixture comprising braze particles and superalloy particles formed into the tip shelf shape and a squealer tip shape, respectively, and configured to mate to a remaining portion of a turbine component such as a blade airfoil. In an embodiment, a first thickness of the tip shelf portion 62 may be in a range 0.030 in. to 0.050 in. while a second thickness of the squealer portion 64 may be in a range 0.060 in. to 0.140 in. If the blade shelf is very thin, for example 0.040 in., its base thickness may be increased by attaching additional shelf PSP material 62 to the existing shelf portion before attaching the composite coupon.

The braze material may comprise any suitable material known in the art for brazing which contains at least an amount of boron effective to reduce a melting temperature of the braze material relative to the same braze material without an amount of boron. In an embodiment, the amount of boron may be an amount of boron effective to reduce a melting temperature of the braze material to a desired degree. In a particular embodiment, the braze material comprises an amount of boron plus a first powder material including the same alloy components as that in the damaged area of the component to be brazed/repaired. Suitable braze material compositions may be found in PCT/US2018/020170, Brazing of Superalloy Components with Hydrogen Addition for Boron Capture which is incorporated herein by reference.

Referring now to FIGS. 1-3, a method for repairing a tip portion of a turbine component having a structural defect is presented. While a turbine component is depicted as a turbine blade in this description and as illustrated in the Figures, it may be appreciated that the repair processes described herein are not limited to blades but may be applied to other damaged metallic components as well. The turbine blade 10 is prepared for a repair process by first removing the damaged tip portion 22 from the remaining turbine blade airfoil 12. Removing the damaged section entails machining and/or cutting at least the squealer portion 36 of the turbine blade airfoil 12 having the damaged section. Additionally, if the shelf section 40 includes wide cracks, e.g. cracks wider than approximately 0.020 inch, the cracks may be filled with paste. When the turbine blade 10 comprises Alloy 247, for example, the paste may be a 247 paste which may be formed by mixing Alloy 247 with a suitable binder. In an embodiment, the upper surface of the remaining blade airfoil 12 may then be machined, for example, to produce a smooth, flat surface in order to mate with a surface of the composite PSP tip portion 60 which will replace the removed damaged tip section. One difference between this process and other traditional processes is that the paste application need only be utilized when a thru crack exists in the shelf portion. Otherwise, the PSP composition during brazing may take care of the defect, i.e. the braze material will flow into and fill the cracks. This in turn allows for a complete repair and facilitates determining where the paste is needed.

Prior to paste application and brazing, optionally, an area including the structural defect of the component may be cleaned. In an embodiment, the cleaning step may be carried out using, fluoride ion cleaning (FIC). In a particular embodiment, the damaged area, including the defect may be cleaned via fluoride ion cleaning (FIC) process to ready the damage surface for brazing. In some situations, cracks may need to be physically opened up prior to FIC process. In some embodiments, the FIC process includes cleaning with hydrogen fluoride gas. Use of FIC cleaning advantageously removes unwanted oxides and residual coating remnants (e.g., diffusion coating remnants) within the defects, as well as on a surface of the component.

In an embodiment, a surface of the PSP tip coupon 60 is applied to a prepared surface of the remaining blade airfoil 12. The PSP tip coupon 60 may be lightly affixed by spot welding to the surface of the blade shelf surface 50, particularly by spot welding in only one or two locations in order to avoid constraining the PSP tip coupon 60 or to avoid having it pop off during brazing. A gap may exist between the surface to be brazed and the PSP tip coupon 60. The PSP tip coupon 60 will form to the surface being brazed during a brazing heat treatment cycle.

Figure 4:
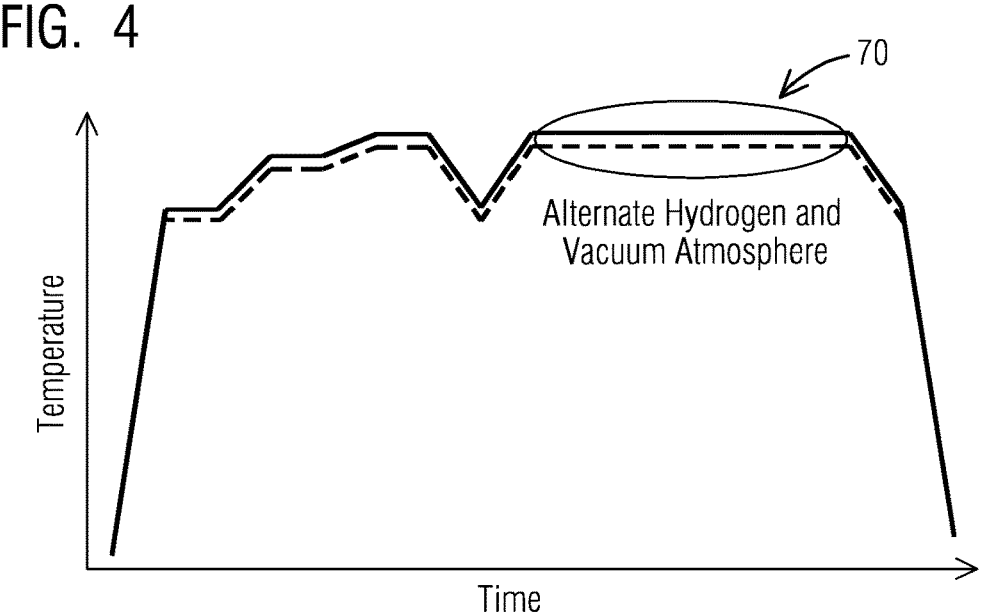
FIG. 4 is a graph depicting an embodiment of a brazing heat treatment cycle.

Once the PSP tip coupon 60 containing braze material has been applied as desired or necessary, the turbine blade along with the PSP is subjected to a heat treatment (referred to herein as 'brazing' or a 'brazing process') in order to at least melt the braze material and allow the molten braze material to flow into the defect. In an embodiment, the brazing heat treatment may be a controlled heat process as described in PCT/US2018/020170, Brazing of Superalloy Components with Hydrogen Addition for Boron Capture. The main difference between this heat treatment and other brazing heat treatment processes is that the component, e.g., the turbine blade and the affixed PSP, are subjected to alternating stages within a hydrogen environment ('hydrogen stage") and within a vacuum environment ("vacuum stage") while heating the braze material and at least a portion of the turbine blade. This alternation process 70 may be seen in the Braze Heat Treatment Chart seen in FIG. 4. Alternating between a hydrogen stage and a vacuum stage helps to eliminate centreline eutectics and improve remelt properties post braze due to deboronization of the low melt portion of the braze mixture. Elimination of centreline eutectics avoids brittle zones in the repair area which tend to crack during service conditions.

Figure 5:
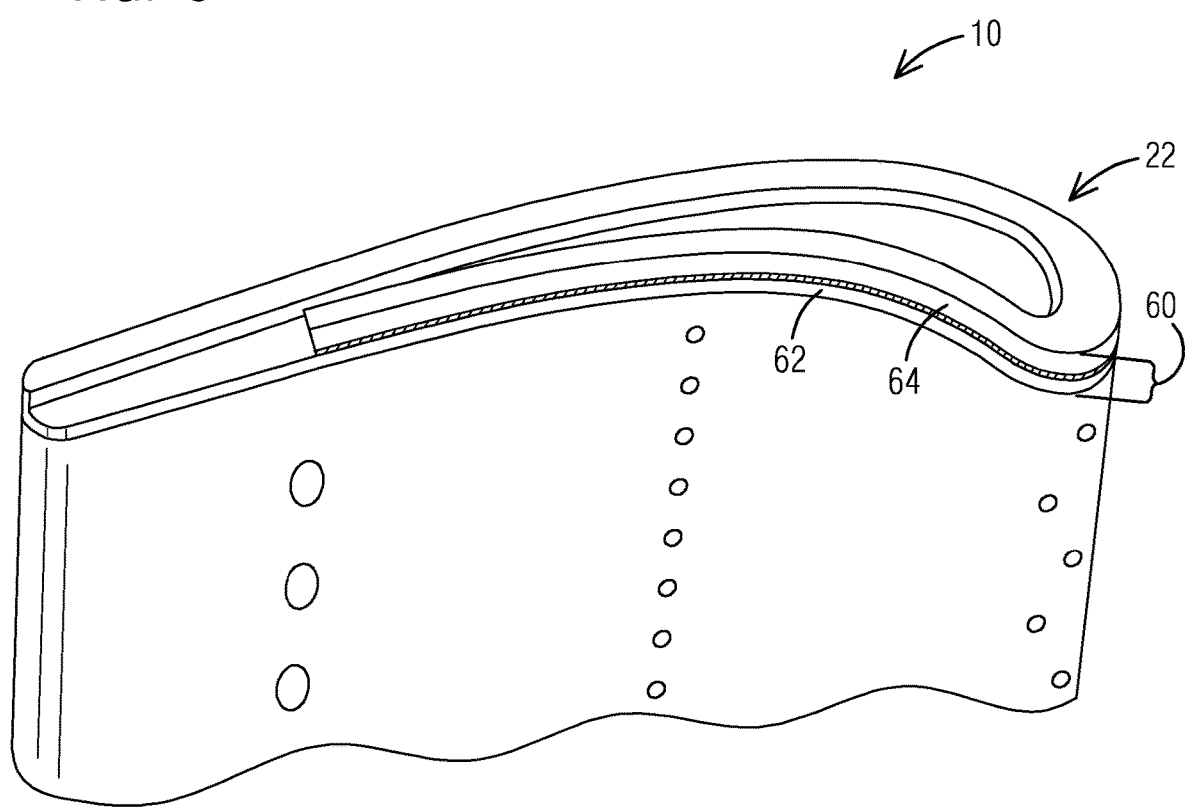
FIG. 5 is a perspective view of a turbine blade repaired utilizing a composite PSP coupon according to an embodiment.

FIG. 5 illustrates a perspective view of a turbine blade 10 repaired utilizing a composite PSP coupon 60. FIG. 5 shows the tip 22 after the brazing. In certain embodiments, finishing processes such as blending, machining, cooling hole drilling and coating operations may be performed as applicable depending on the desired final blade configuration.

The disclosure provides a process that can repair a tip section of a turbine component without welding which is costly, time consuming, and may induce weld related cracking and deformation. The composite PSP tip coupon allows for one material composition for the squealer tip portion and a different material composition for the shelf portion of a turbine airfoil, for example. The PSP composition selection is based on the operating condition and the damage modes that need to be repaired. Having the squealer portion with a higher percentage of the substrate alloy material and less braze material allows the squealer to have better oxidation and wear properties while a higher percentage of braze material in the shelf portion than the tip portion may be needed to fill in cracks in the blade shelf. Finally, among other benefits, the utilization of the PSP tip coupon combined with minimum paste application, results in a component that conforms more to the existing and/or required final geometry. This in turn reduces the amount of post processing (blending or machining) required after the process is completed. Given that brazing works based on capillary action, with the proper care and procedures, the chances of plugging internal cavities are also minimized. While embodiments described have been directed toward turbine blade repair, the proposed method could extend to the repair of other superalloy components.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A method for repairing a tip portion of a turbine component having a structural defect, comprising:
   providing a turbine component with a structural defect in a tip portion of the turbine component;
   the turbine component comprising a superalloy base material,
   removing at least a portion of the structural defect by machining or cutting the tip portion of the turbine component;
   providing a pre-sintered preform (PSP) configured to mate with an upper surface of a remaining portion of the turbine component;
   applying the PSP to the upper surface, wherein the PSP comprises a superalloy material and a braze material; and
   subjecting the PSP and the remaining portion of the turbine component to a brazing process to melt the braze material and fill in any remaining portion of the structural defect,
   wherein the PSP comprises a first portion having a first composition and a second portion having a second composition.

2. The method as claimed in claim 1, wherein the first portion corresponds to a shelf portion of the tip and the second portion corresponds to a squealer portion of the tip.

3. The method as claimed in claim 2, wherein the first composition includes 60 to 90% wt. superalloy material and 10 to 40% wt. braze material and wherein the second composition includes 70 to 90% wt. superalloy material and 10 to 30% wt. braze material.

4. The method as claimed in claim 3, wherein the first composition includes 70% wt. superalloy material and 30% wt. braze material and wherein the second composition includes 80% wt. superalloy material and 20% wt. braze material.

5. The method as claimed in claim 4, wherein the superalloy material comprises:
   Carbon=0.07-0.15%;
   Chromium=8.1-8.4%;

Cobalt=9.2-10.0%;
Aluminium=5.5-5.6%;
Boron=0.015%;
Tungsten=9.5-10.0%;
Molybdenum=0.5-0.7%;
Tantalum=3.0-3.2%;
Titanium=0.7-1.0%;
Hafnium=1.4-1.5%;
Zirconium=0.015-0.05%; and
Nickel=balance.

6. The method as claimed in claim 3, wherein the superalloy material of the pre-sintered preform (PSP) is the same material as the remaining portion of the turbine component.

7. The method as claimed in claim 3, wherein the braze material of the pre-sintered preform (PSP) comprises boron.

8. The method as claimed in claim 3, further comprising applying a paste mixture of superalloy powder with a binder to wide cracks in the shelf portion.

9. The method as claimed in claim 1, wherein the applying comprises affixing the pre-sintered preform (PSP) to the upper surface in at least one location by spot welding.

10. The method as claimed in claim 1, wherein the applying comprises affixing the pre-sintered preform (PSP) to the upper surface at only one location by spot welding.

11. The method as claimed in claim 1, wherein the brazing process comprises alternating between a first stage wherein an amount of hydrogen is introduced into an environment about the turbine component effective to form boranes from the boron and the hydrogen in the braze material and a second stage wherein the formed boranes are removed via negative pressure.

12. A pre-sintered preform (PSP) corresponding to a tip of a turbine component, comprising:
a tip shelf portion configured to mate with a top surface of a turbine component airfoil; and
a squealer portion extending radially outward from the tip shelf portion,
wherein the tip shelf portion comprises a first composition and the squealer portion comprises a second compositions,
wherein the first composition and the second composition are different.

13. The pre-sintered preform (PSP) as claimed in claim 12, wherein the first composition includes 60 to 90% wt. superalloy material and 10 to 40% wt. braze material and wherein the second composition includes 70 to 90% wt. superalloy material and 10 to 30% wt. braze material.

14. The pre-sintered preform (PSP) as claimed in claim 13, wherein the superalloy material of the pre-sintered preform (PSP) is the same material as the remaining portion of the turbine component 10.

15. The pre-sintered preform (PSP) as claimed in claim 13, wherein the braze material of the pre-sintered preform (PSP) comprises boron.

16. The pre-sintered preform (PSP) as claimed in claim 12, wherein the first composition includes 70% wt. superalloy material and 30% wt. braze material and wherein the second composition includes 80% wt. superalloy material and 20% wt. braze material.

17. The pre-sintered preform (PSP) as claimed in claim 16, wherein the superalloy material comprises:
Carbon=0.07-0.15%;
Chromium=8.1-8.4%;
Cobalt=9.2-10.0%;
Aluminium=5.5-5.6%;
Boron=0.015%;
Tungsten=9.5-10.0%;
Molybdenum=0.5-0.7%;
Tantalum=3.0-3.2%;
Titanium=0.7-1.0%;
Hafnium=1.4-1.5%;
Zirconium=0.015-0.05%; and
Nickel=balance.

* * * * *